UNITED STATES PATENT OFFICE.

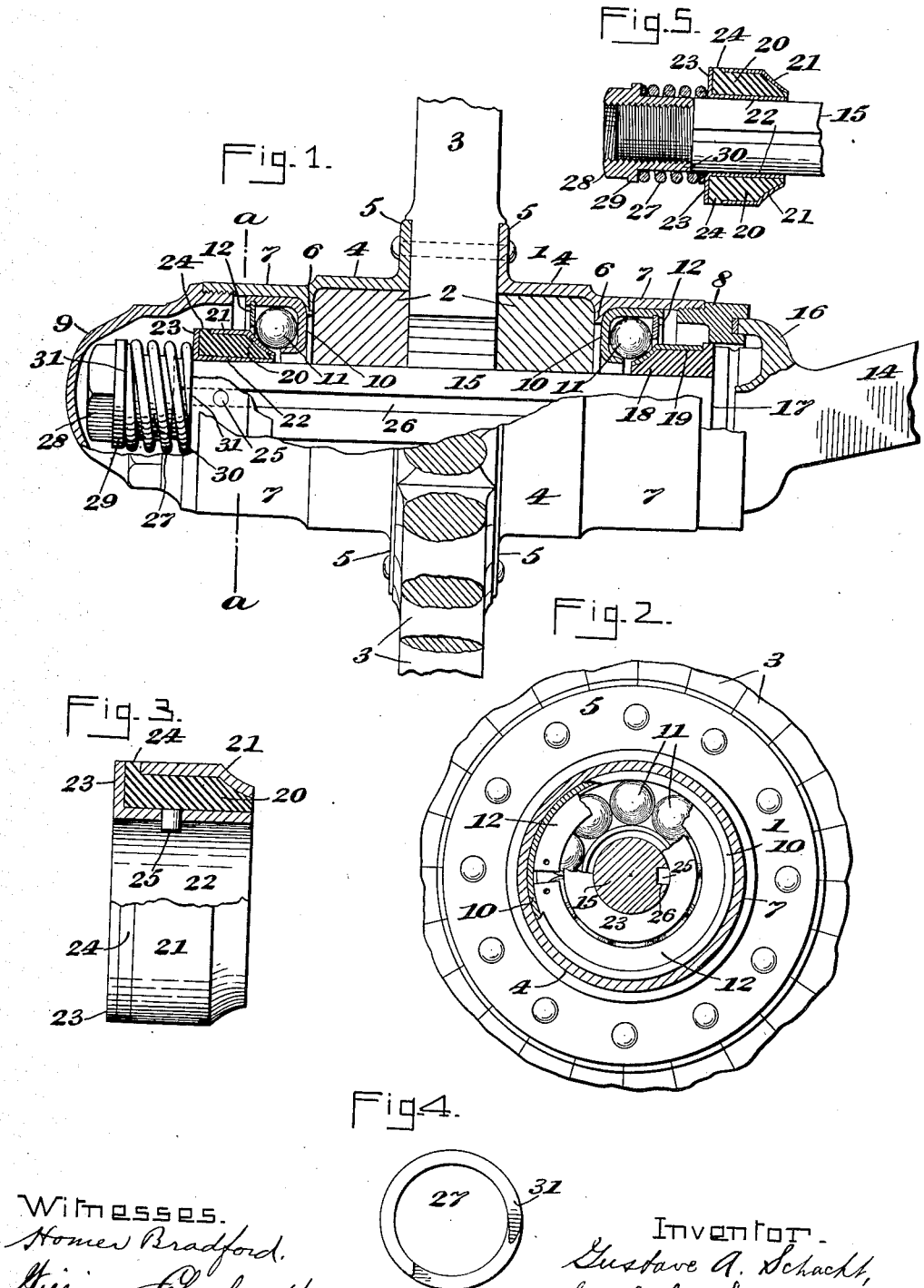

GUSTAVE A. SCHACHT, OF CINCINNATI, OHIO.

BEARING FOR VEHICLE-WHEELS.

No. 918,600.    Specification of Letters Patent.    Patented April 20, 1909.

Application filed March 24, 1906. Serial No. 307,777.

*To all whom it may concern:*

Be it known that I, GUSTAVE A. SCHACHT, a citizen of the United States of America, and a resident of Cincinnati, in the county of Hamilton and State of Ohio, have invented certain new and useful Improvements in Bearings for Vehicle-Wheels, of which the following is a specification.

This invention relates to certain improvements in bearings for vehicle-wheels and more especially in that class of such devices wherein cushioning means is provided for reducing the stress and shock to which the parts are exposed in service, and the object of the invention is to provide a bearing for vehicle-wheels of this general character of a simple and comparatively inexpensive nature and of a strong, compact and durable construction having cushioning means of an improved and simplified character not liable to become readily deranged or broken and so housed or incased within the hub as to be effectively protected against wear due to the collection of dust and gritty substances within the bearings.

The invention consists in certain novel features of the construction, combination and arrangement of the several parts of the improved bearings for vehicle-wheels, whereby certain important advantages are attained and the device is rendered simpler, cheaper and otherwise better adapted and more convenient for use, all as will be hereinafter fully set forth.

The novel features of the invention will be carefully defined in the claim.

In the accompanying drawings which serve to illustrate the invention—Figure 1 is a fragmentary sectional view showing a wheel bearing constructed according to my invention, together with the connected portions of the spokes and axle; Fig. 2 is a vertical section taken transversely through the improved wheel-bearing in the plane indicated by line *a—a* in Fig. 1; Fig. 3 is a sectional detail view showing one of the cushioned cones for the improved wheel-bearing; Fig. 4 is an end view showing the cushioning spring for the outer end of the axle, and Fig. 5 is a fragmentary sectional view showing certain features of the cushioning means to be hereinafter described.

In these views, 1 represents the wheel-bearing as a whole, comprising wooden or other blocks or fillings 2, 2, between which are held the inner ends of the wooden spokes 3, and incased with metallic shells or casings 4, 4, extended in tubular or hollow form over the inner and outer ends of the hub and provided with flanges 5, 5, bearing at opposite sides of the spokes 3 and adapted for the passage of bolts or rivets for holding said spokes in relation to the hub. So far as described, the hub construction has no especial novelty, being that ordinarily employed.

The inner and outer shells or casings 4, 4, are provided with inwardly-directed annular flanges or seats 6, 6 which fit upon the outer edge surfaces of the wooden blocks or fillings 2, 2, to retain the same in intimate relation with the spokes 3, and beyond said flanges or seats 6, 6 said shells or casings 4, 4 are extended in reduced diameters, as seen at 7, 7 on Fig. 1 the hollows or chambers within said extended portions 7 of the shells or casings being designed for receiving certain bearing and cushioning means as will be hereinafter described.

8 represents a sand-band arranged at the inner end of the hub to prevent the entry of sand and dust into the bearings and 9 represents a dust-cap applied in a well-known way to close the outer end of the hub for a similar purpose.

10, 10, represent annular bearing-members or ball races which are fitted within the interior hollows or chambers of the extended end portions 7, 7 of the shells or casings 4, 4 and 11 represent balls held in annular series in said members or races and retained in position by split ball-retainers 12 in a well known way.

14 is the axle whereon the hub 1 is mounted to turn and 15 is the spindle thereof extended axially through the hub and provided with bearing devices at the inner and outer ends thereof as will be hereinafter explained. Said axle has an annular-flanged collar 16 intimately engaged with the sand band 8 at the inner end of the hub and provided with a shoulder 17 extended in annular formation around the spindle 15 and whereon is engaged the inner cushioned bearing-member or cone 18, which has a body portion of annular form made from some such elastic substance as India rubber and of a diameter to adapt it to be snugly slipped upon the spindle 15, said member or cone 18 having a peripheral shell 19 of hardened steel or other suitable metal securely held upon its elastic body portion and forming a bearing-surface which is engaged inside the series of balls 11 in the ball-race 10 at the inner end of the hub. In constructing the bearing-member or cone 18, the India rubber will, by preference, be vulcanized within the peripheral shell 19 so as to afford a secure attachment of the parts and the inner edge of said shell 19 will be spaced away from the axle-shoulder 17 so as to afford freedom of movement of the shell upon the body portion to permit cushioning of the inner end of the hub to protect the parts against shocks and vibration in the use of the device. 20 represents another bearing-member or cone held upon the outer end of the axle-spindle 15 within the hollow or chamber of the extended outer portion 7 of the wheel-hub and also formed with an elastic or compressible body portion of India rubber or the like upon which is held a peripheral shell 21 similar to the shell 19 and adapted for contact with the balls of the race 10 at the outer end of the hub. The member or cone 20 is designed for a certain extent of movement lengthwise upon the axle-spindle 15 and to permit such movement without undue wear of the elastic body of said member, the latter is provided with an inner shell or lining 22 of hardened metal which contacts upon the spindle 15 and has an inwardly-extended pin or projection 25 adapted for sliding engagement within a guide-way or channel 26 longitudinally-extended in the spindle so that the cone or member 20 is also held from turning independently of the axle.

The lining 22 is separately formed from the shell 21 of the cone or member 20 and does not contact therewith, and in this way the shell 21 is permitted to move slightly independently of the spindle 15 so as to permit the compressible or elastic body portion of said member 20 to overcome shocks and vibration and prevent the same from being transmitted to the spindle.

The inner shell or lining 22 of the member or cone 20 has an outwardly-directed flange 23 at its outer end, the margin of said flange being also spaced apart as shown at 24, from the peripheral shell 21 so as to permit independent movement thereof, and upon the extremity of the axle-spindle 15, outside of said member or cone 20 is held a coiled spring 27 of suitable tension, the inner end of which has bearing upon said flange 23 of the lining 22, while its outer end has bearing upon a shoulder 29 upon a nut 28 having threaded engagement with said outer extremity of the spindle 15 within the dust-cap 9. By preference, the construction of these parts will be as shown in detail in Fig. 5, the nut 28 having a reduced sleeve-like portion 30 of equal diameter to the axle-spindle 15 and around which the spring 27 is coiled. This structure affords a secure screw-connection of the nut with the axle without necessitating excessive projection of the spindle 15 beyond the outer bearing-member. The spring 27 will also, by preference, have closed end coils as indicated at 31 in Figs. 1 and 4, so as to have uniform bearing upon the nut and flange.

By this construction, it will be evident that in the use of the improved wheel-bearing, slight shocks and vibration will be absorbed by the compressible or elastic body portions of the inner and outer bearing members or cones 18 and 20, so that the liability of crystallization or breakage of the metal of the axle-spindle is avoided and in case excessive shock is encountered as where the wheel strikes a sharp obstruction in the road, the outer bearing-member or cone 20 is permitted to move endwise along the spindle 15, placing the coiled spring 27 under tension so that liability to breakage of the spindle or undue jolting or jarring of the vehicle is effectively prevented.

In case of wear of the bearings, the spring 27 will act to automatically compensate therefor, and if at any time the tension of said spring should prove insufficient for this purpose, rectification may be accomplished by the application of a washer or washers upon the nut at the outer end of the spring. Such rectification may also be accomplished by adjustment of the nut upon the axle-spindle, but it is usually desirable to set said nut up tightly against the shoulder at the threaded end of the spindle to prevent it from being accidentally loosened.

The improved wheel-bearing constructed according to my invention is of an extremely simple and inexpensive nature and is especially well adapted for use, particularly on light vehicles, by reason of the light and compact character of the cushioned bearing means and the effective operation thereof in preventing crystallization or breakage of the axle-spindle by the absorption of shock and vibration. When lubricant is applied to the bearings, the guide-way or channel 26 serves to convey the same to the outer movable member or cone 20 so that the same is prevented from binding upon the spindle.

Having thus described my invention, what I claim and desire to secure by Letters-Patent is—

The combination of a hub having chambered ends, ball-races held in the chambers at the ends thereof, balls in circular series in said ball-races, an axle having a spindle passed through the hub, an elastic bearing-member held against movement on the inner end of the axle-spindle and having a peripheral shell for engagement with the balls in the corresponding ball-race, another elastic bearing-member mounted for endwise but not rotatory movement on the outer end of said axle-spindle and provided with a peripheral shell adapted for engagement with the balls of the other race, an internal, flanged shell or lining for said last-named elastic bearing-member, and a spring coiled on said axle-spindle and engaged with the said flanged inner shell or lining of said last-named elastic bearing-member for retaining the same in bearing position and the whole being adapted to relieve the spindle from shock and vibration.

Signed at Cincinnati, Ohio, this 14th day of March, 1906.

GUSTAVE A. SCHACHT.

Witnesses:
JOHN ELIAS JONES,
M. YOUNG.